United States Patent
Jackson et al.

(10) Patent No.: US 10,876,306 B2
(45) Date of Patent: Dec. 29, 2020

(54) BRIDGE OVERHANG BRACKET ASSEMBLY

(71) Applicants: Barry Walter Jackson, Mississauga (CA); David George Jackson, Mississauga (CA)

(72) Inventors: Barry Walter Jackson, Mississauga (CA); David George Jackson, Mississauga (CA)

(*) Notice: Subject to any disclaimer, the term of this patent is extended or adjusted under 35 U.S.C. 154(b) by 1 day.

(21) Appl. No.: 15/726,513

(22) Filed: Oct. 6, 2017

(65) Prior Publication Data

US 2019/0106891 A1     Apr. 11, 2019

(51) Int. Cl.

| E04G 17/18 | (2006.01) |
| F16B 2/06 | (2006.01) |
| E01D 21/00 | (2006.01) |
| E04G 3/34 | (2006.01) |
| E01D 19/12 | (2006.01) |
| E01D 21/10 | (2006.01) |

(52) U.S. Cl.
CPC ............. *E04G 17/18* (2013.01); *E01D 21/00* (2013.01); *E04G 3/34* (2013.01); *F16B 2/065* (2013.01); *E01D 19/125* (2013.01); *E01D 21/10* (2013.01)

(58) Field of Classification Search
CPC .. E04G 17/18; E04G 3/00; E04G 3/18; E04G 13/066; E04G 13/06; E04G 3/34; E01D 21/10; E01D 19/125; E01D 21/105; E01D 19/12; E01D 21/00; F16B 2/065; A47B 5/04; A47B 96/061
See application file for complete search history.

(56) References Cited

U.S. PATENT DOCUMENTS

| 2,414,538 | A | | 1/1947 | Lamb | |
| 3,119,590 | A | * | 1/1964 | Eriksson | ................. E04G 13/06 |
| | | | | | 248/240.3 |
| 4,470,574 | A | | 11/1984 | Jackson | |
| 5,112,155 | A | | 5/1992 | Jackson | |
| 5,273,415 | A | | 12/1993 | Jackson | |
| 5,310,153 | A | | 5/1994 | Jackson | |
| 5,326,065 | A | | 7/1994 | Jackson | |

(Continued)

FOREIGN PATENT DOCUMENTS

| CA | 2122736 A1 | 5/1993 |
| CA | 2130119 C | 8/1993 |

(Continued)

*Primary Examiner* — Christopher Garft
(74) *Attorney, Agent, or Firm* — Bereskin & Parr LLP/S.E.N.C.R.L., s.r.l.

(57) ABSTRACT

An improved bridge overhang bracket assembly may include top, diagonal and side members. A hanger element may be mounted to the top member and pivotally attached proximate to the top end of the side member. The hanger element may be translatable along the top member for adjusting its longitudinal position, to vary the positions of the diagonal and side members quickly and easily, without disassembly, and may enable folding of the members to a shipping/storage position. A second hanger element may be mounted to the top member for attaching the assembly to a tie rod. The diagonal member may include at least one connection tab for receiving a bolt to connect the top and diagonal members together in the shipping/storage position. Also disclosed is a fastener assembly for securing a side rail to a T-bolt channel.

20 Claims, 15 Drawing Sheets

(56) References Cited

U.S. PATENT DOCUMENTS

| | | | |
|---|---|---|---|
| 5,524,854 A * | 6/1996 | McSwain | E01D 21/00 248/235 |
| 5,813,185 A | 9/1998 | Jackson | |
| 6,059,258 A | 5/2000 | Jackson | |
| 7,032,268 B2 | 4/2006 | Jackson | |
| 7,159,262 B2 * | 1/2007 | Jackson | E01D 21/00 14/77.1 |
| 7,360,341 B2 | 4/2008 | Jackson et al. | |
| 2001/0037614 A1 * | 11/2001 | Hambelton | E04G 13/066 52/73 |
| 2008/0111040 A1 | 5/2008 | Jackson et al. | |
| 2013/0170941 A1 * | 7/2013 | Drott | B65D 90/0033 414/809 |

FOREIGN PATENT DOCUMENTS

| | | |
|---|---|---|
| CA | 2138795 A1 | 4/1994 |
| CA | 2130451 C | 7/1994 |
| CA | 2118170 A1 | 4/1996 |
| CA | 2203978 C | 10/1997 |
| CA | 2249921 C | 4/1999 |
| CA | 2440612 A1 | 3/2004 |
| CA | 2444449 C | 4/2005 |
| CA | 2496089 A1 | 8/2006 |
| CA | 2534944 C | 8/2006 |
| GB | 2146687 A | 4/1985 |
| GB | 2146728 A | 4/1985 |
| WO | 9309311 A1 | 5/1993 |
| WO | 9316253 A1 | 8/1993 |
| WO | 9415045 A1 | 7/1994 |
| WO | 9425705 A2 | 11/1994 |

* cited by examiner

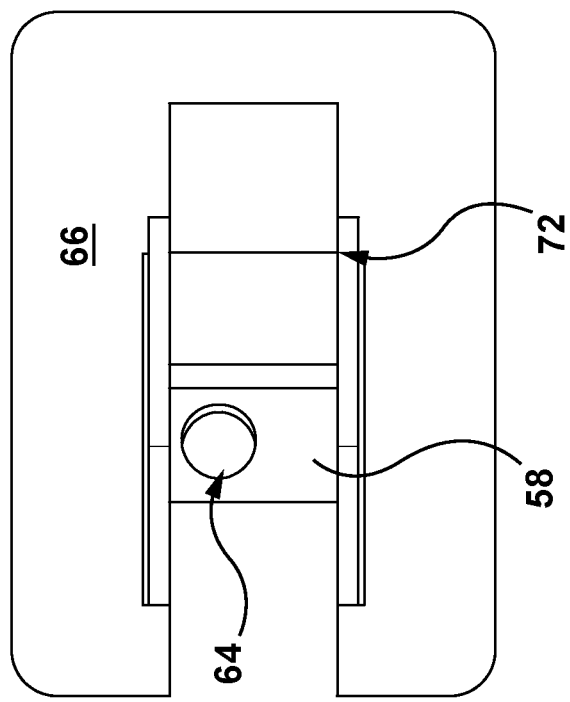
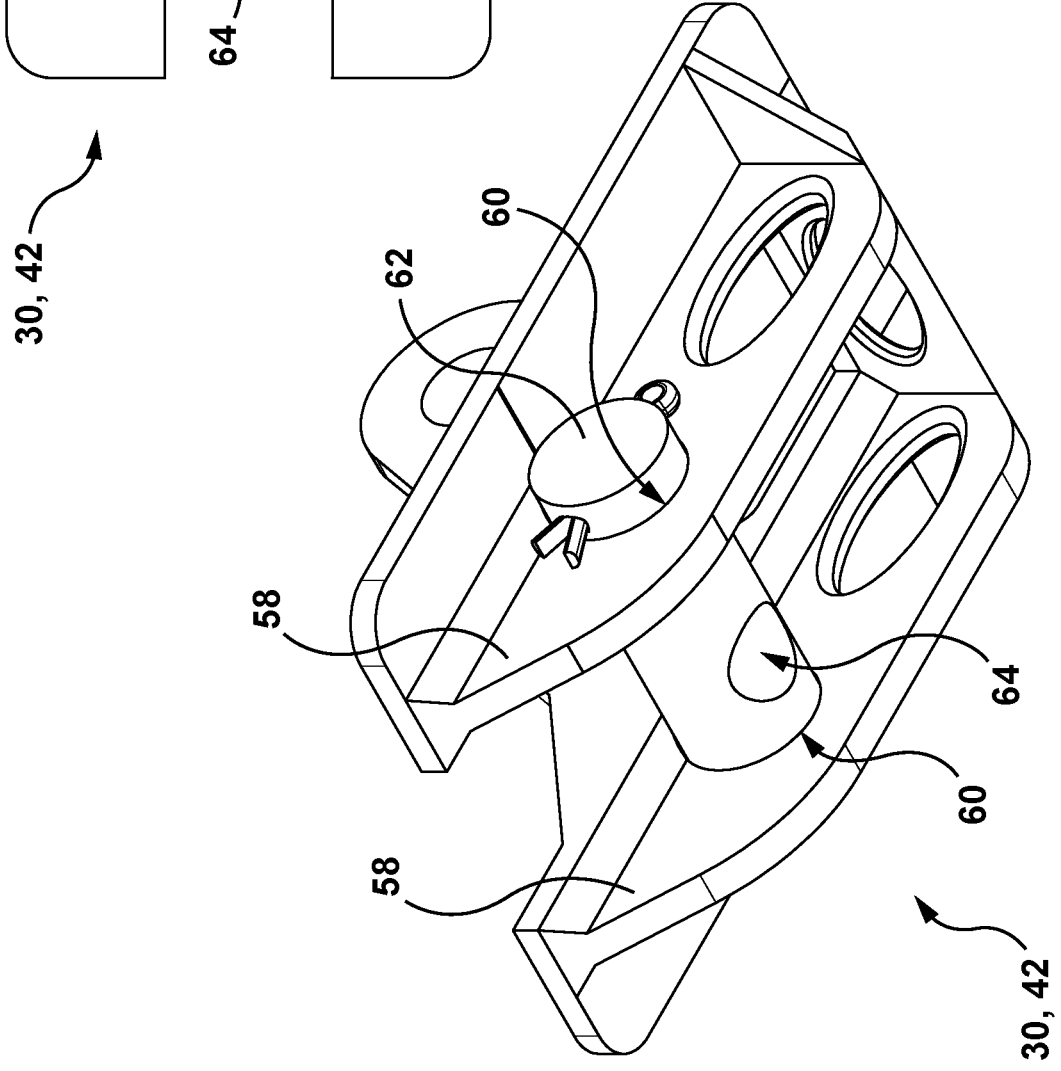
FIG. 8B
FIG. 8A

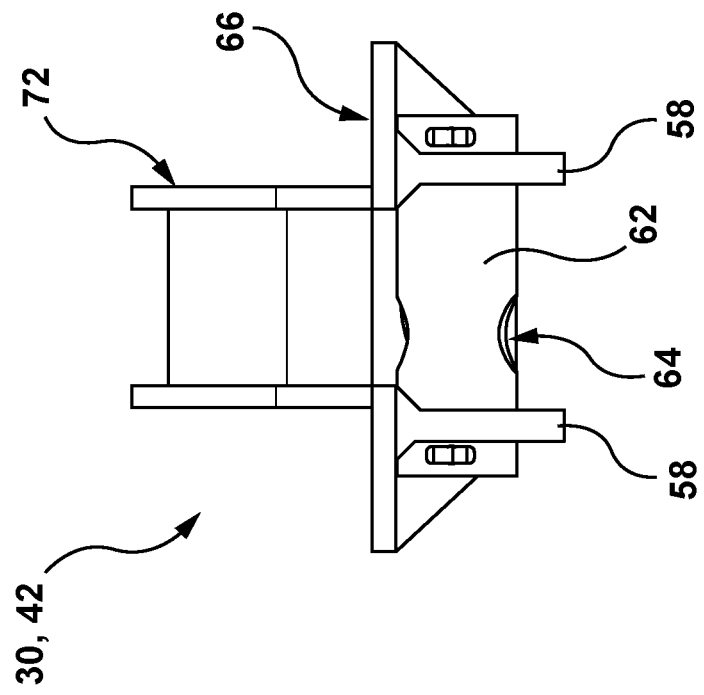
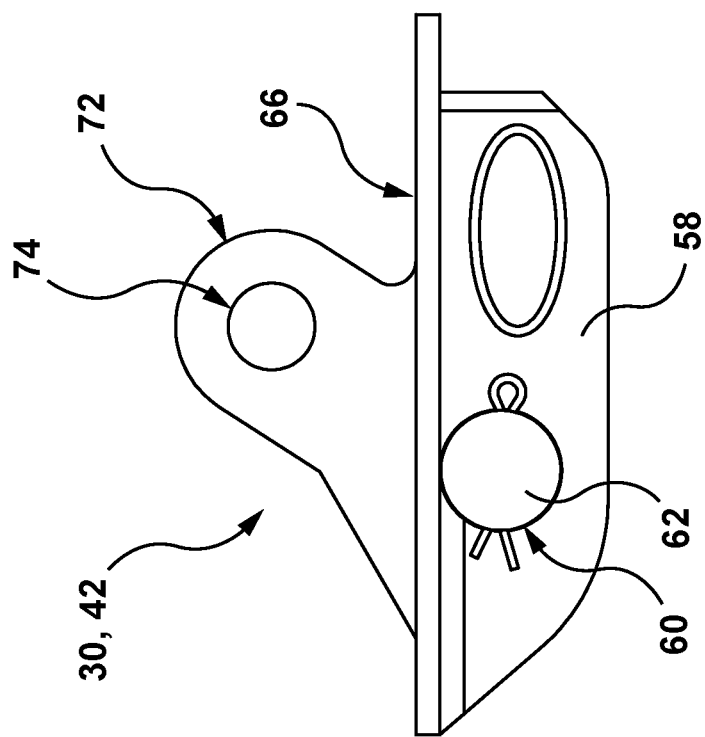
FIG. 9B
FIG. 9A

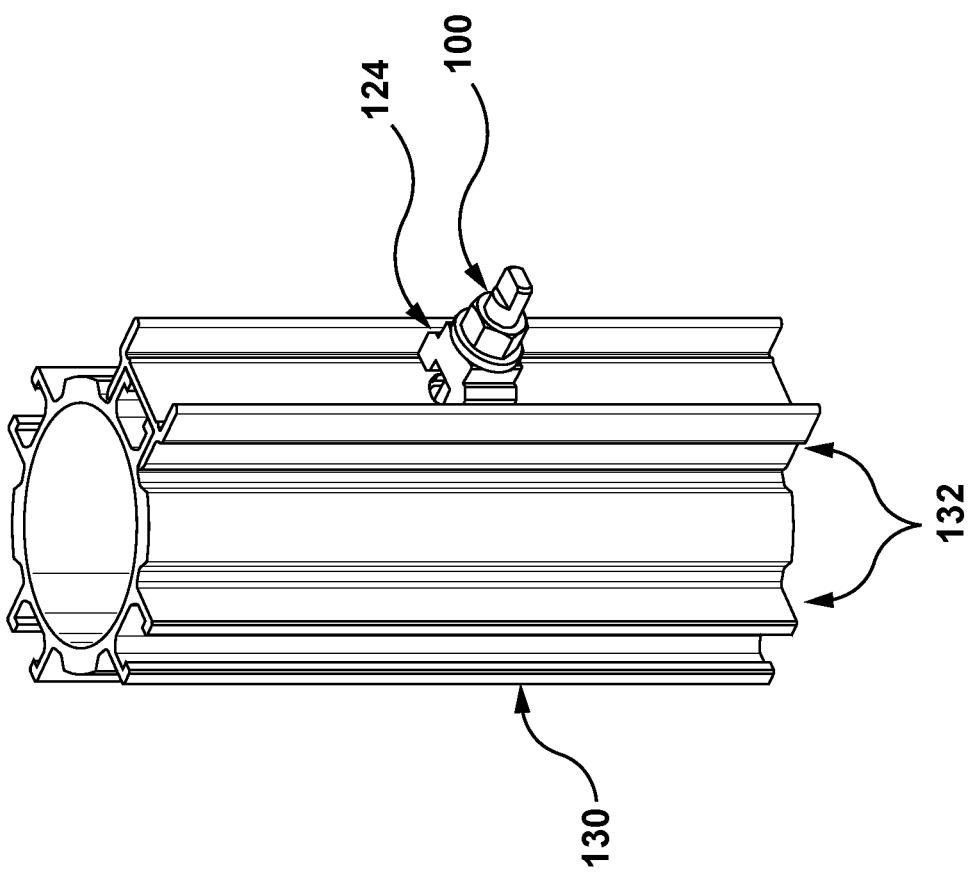

BRIDGE OVERHANG BRACKET ASSEMBLY

FIELD

The present disclosure relates generally to shoring devices, for example, brackets used for bridge overhangs, and related hardware.

BACKGROUND

The following paragraphs are not an admission that anything discussed in them is prior art or part of the knowledge of persons skilled in the art.

U.S. Pat. No. 6,059,258 discloses a support structure for temporarily shoring poured concrete slabs in place. The support structure can be assembled and/or disassembled on site. The structure includes post shores which act as the legs of a shoring tower when assembled with ledgers, stringers, joists and/or cross braces, but can also be used separately as single post shores. The support structure can be adjusted to a number of heights and configurations. The ledgers are mounted to the post shores with T-bolts for ease of assembly and disassembly.

U.S. Pat. No. 7,032,268 discloses a bridge overhang bracket that includes an elongate top member having inner and outer ends an elongate diagonal member having an inner end and an outer end, the outer end of the diagonal member pivotally attached to the outer end of the top member, upper and lower pivot joints secured to the top member and diagonal member, respectively, adjacent the respective inner ends thereof, and an elongate side member extending between and engaged with the upper and lower pivot joints. At least one of the pivot joints comprises an adjustable axial engagement mechanism for adjusting the position along the length of the side member at which the at least one pivot joint engages the side member.

U.S. Pat. No. 7,159,262 discloses an overhang bracket that has a top member, a side member and a diagonal member. The side and top member may be connected together through a removable connecter. A guardrail post holder allows a guardrail post to be installed at a variety of angles to the top member. Rotating the side member causes the diagonal member to translate up or down the side member. A side member locator extends upwards from the overhang bracket to indicate the location of the side member. A tie rod holder holds a tie rod in an offset position relative to the side member. The side member locator may extend upwards through further parts of the shoring system or bridge overhang structure, for example a floor of a concrete form or rebar. A worker may adjust the overhang bracket in place from a standing position on a supporting structure or the floor of the form.

INTRODUCTION

The following is intended to introduce the reader to the detailed description that follows and not to define or limit the claimed subject matter.

In an aspect of the present disclosure, a bridge overhang bracket assembly may include: a top member extending lengthwise between inner and outer ends; a diagonal member extending lengthwise between lower and upper ends, the top and diagonal members being pivotally attached proximate to the respective outer and upper ends thereof; a hanger element mounted to the top member and translatable along the top member for adjusting a longitudinal position of the hanger element relative to the top member; and a side member extending lengthwise between bottom and top ends, the diagonal and side members being pivotally attached proximate to the respective lower and bottom ends thereof, and the hanger element being pivotally attached proximate to the top end of the side member.

In an aspect of the present disclosure, a bridge overhang bracket assembly may include: a top member extending lengthwise between inner and outer ends; a diagonal member extending lengthwise between lower and upper ends, the top and diagonal members being pivotally attached proximate to the respective outer and upper ends thereof, the diagonal member including at least one connection tab arranged intermediate the lower and upper ends, the connection tab for receiving a bolt to connect the top and diagonal members together in a shipping/storage position; a hanger element mounted to the top member; and a side member extending lengthwise between bottom and top ends, the diagonal and side members being pivotally attached proximate to the respective lower and bottom ends thereof, and the hanger element being pivotally attached proximate to the top end of the side member.

In an aspect, the present disclosure further relates to a fastener assembly for securing a side rail to a T-bolt channel, the side rail having an opening, and the T-bolt channel having an opening width, an inner width and interior edges. The fastener assembly may include: a clamp member including an inner side, an opposed outer side, and a bore extending along a bore axis through the clamp member between the inner and outer sides; a bolt including a head at the inner side of the clamp member and a body extending through the bore, the head having a width and a length each perpendicular to the bore axis, the width being smaller than the opening width of the T-bolt channel and the length being larger than the opening width and smaller than the inner width of the T-bolt channel, the bolt being slidable relative to the clamp member along the bore axis between a retracted position in which the head is proximate to the inner side and an advanced position in which the head is spaced from the inner side; a nut threaded onto the body of the bolt at the outer side of the clamp member; and a biasing member arranged between the clamp member and the nut to bias the bolt to the retracted position. In the advanced position, the bolt is rotatable relative to the clamp member about the bore axis between (i) unlocked engagement in which the head is insertable through the opening of the side rail into the T-bolt channel, and (ii) locked engagement in which the head is arranged to engage the overlapping interior edges of the T-bolt channel, with the biasing member urging the head against the T-bolt channel in a first direction and the clamp member against the side rail in a second direction opposite the first direction.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings:

FIGS. 8A, 8B, 9A and 9B are perspective, bottom, side and end views, respectively, of a hanger element of the assembly of FIG. 1;

FIG. 14 is a perspective view of the fastener assembly of FIG. 10, the side rail and a shoring leg including T-bolt channels.

DETAILED DESCRIPTION

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

A first aspect of the present disclosure relates to bridge overhang brackets. Bridge overhang brackets are described in U.S. Pat. Nos. 7,032,268 and 7,159,262, and the entire contents of each are hereby incorporated herein by reference.

Figure 1:
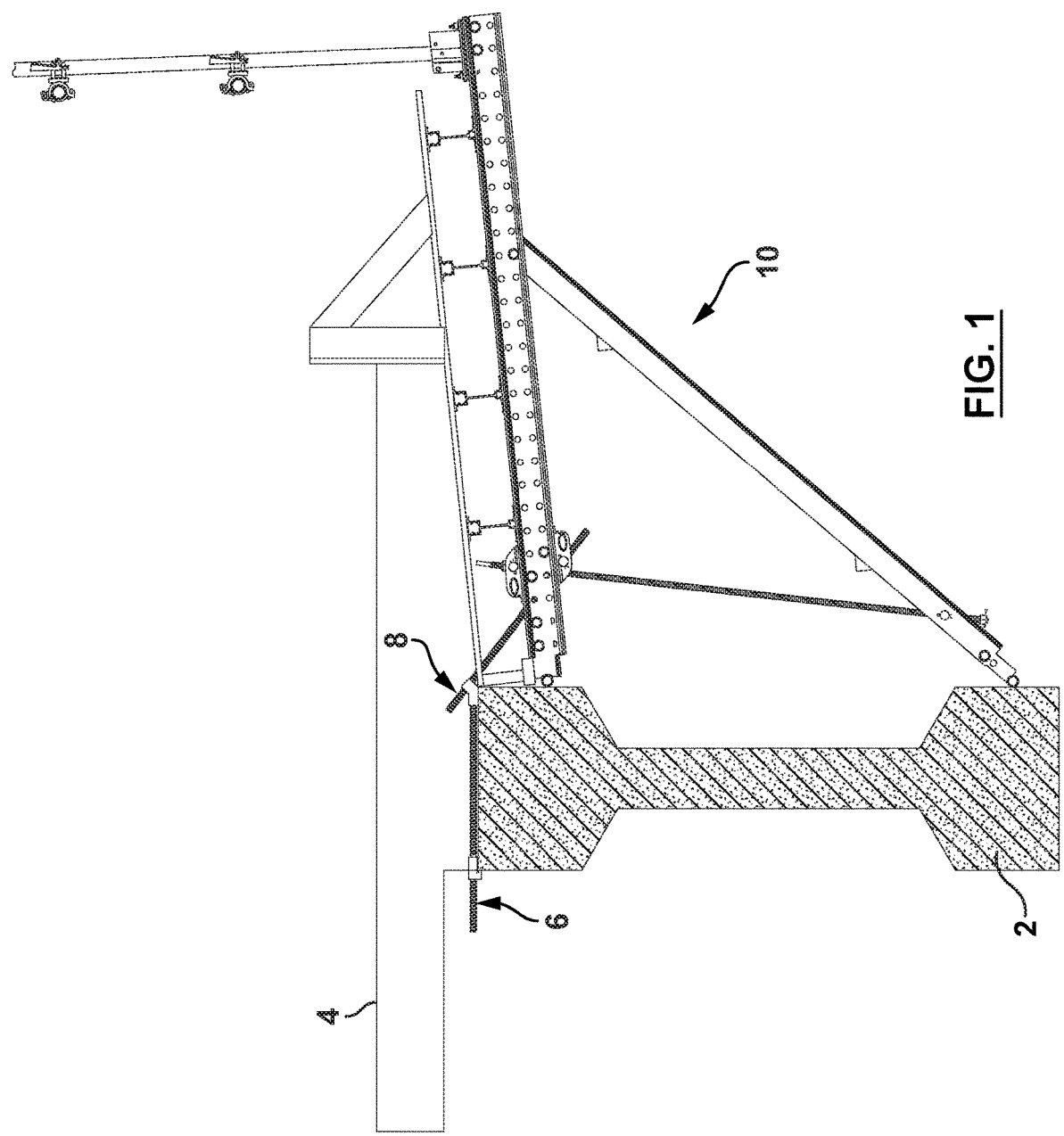
FIG. 1 is a side view of an example of an improved bridge bracket overhang assembly installed onto a bridge girder/beam.

FIG. 1 shows a concrete beam or girder 2 for supporting a bridge deck 4. An example of an improved bridge overhang bracket assembly is shown generally at reference numeral 10. A hanger rod 6 is affixed to the beam 2, and a tie rod 8 couples the hanger rod 6 and the assembly 10.

Figure 2:
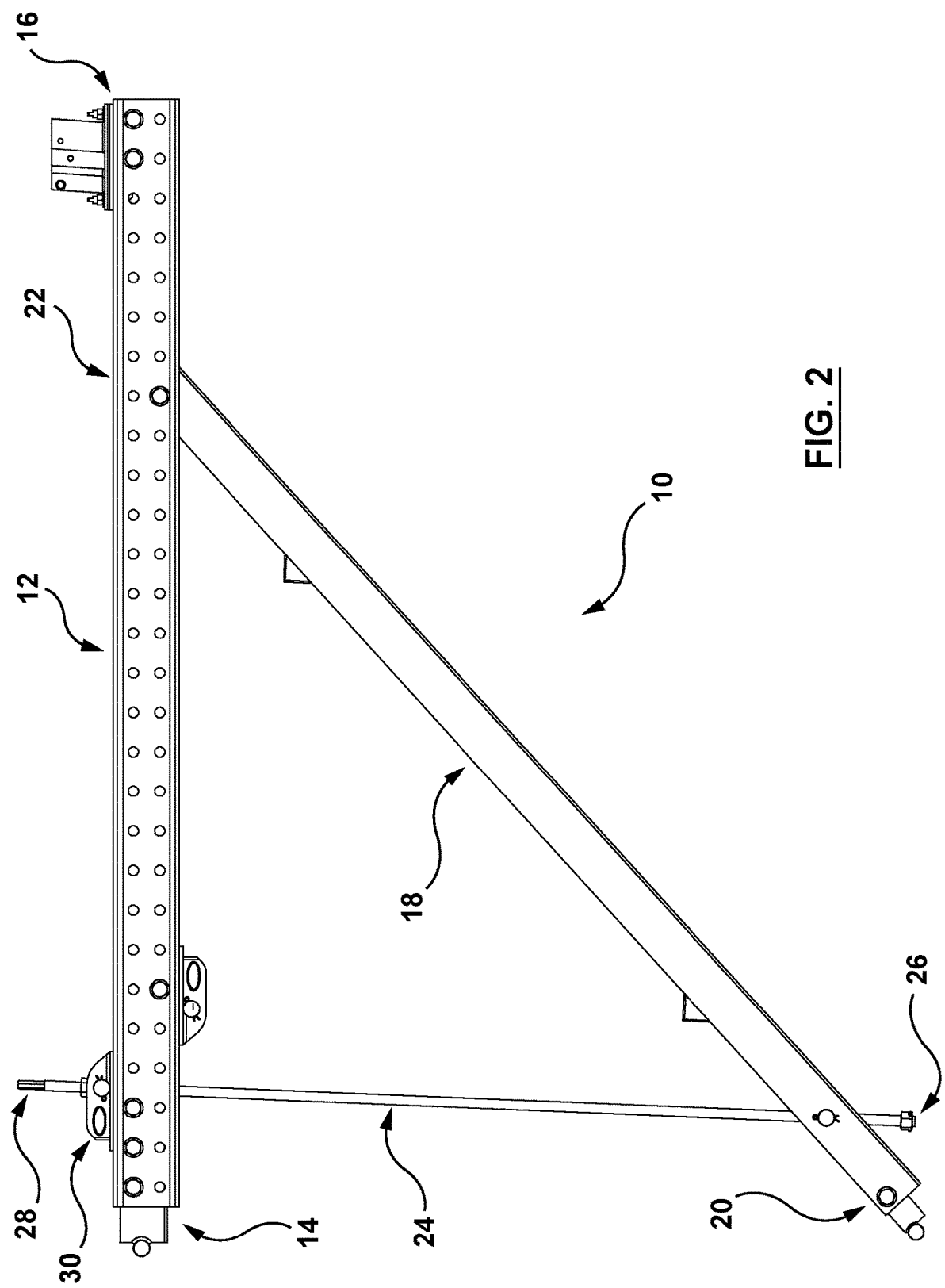
FIGS. 2 and 3 are side and exploded views, respectively, of the assembly of FIG. 1.

In the example illustrated in FIG. 2, the assembly 10 has three elongate members, namely, a top member 12 extending lengthwise between inner and outer ends 14, 16, a diagonal member 18 extending lengthwise between lower and upper ends 20, 22, and a side member 24 extending lengthwise between bottom and top ends 26, 28.

The terms top, diagonal and side are used herein to assist in describing the assembly 10, and are not intended to be limiting. The top and side members 12, 24 may depart significantly from the horizontal and vertical, respectively.

The top and diagonal members 12, 18 are shown pivotally attached proximate to the outer and upper ends 16, 22. The diagonal and side members 18, 24 are shown pivotally attached proximate to the lower and bottom ends 20, 26. In use, ends 14, 20 are nearest the beam or other supporting structure (not shown), while the ends 16, 22 are the outboard ends of the respective members 12, 18, furthest from the beam.

In the example illustrated, the assembly 10 includes a hanger element 30 mounted to the top member 12. The hanger element 30 may be translatable along the top member 12 between the inner and outer ends 14, 16 for adjusting a longitudinal position of the hanger element 30 relative to the top member 12. The hanger element 30 is shown pivotally attached proximate to the top end 28 of the side member 24.

Figure 3:
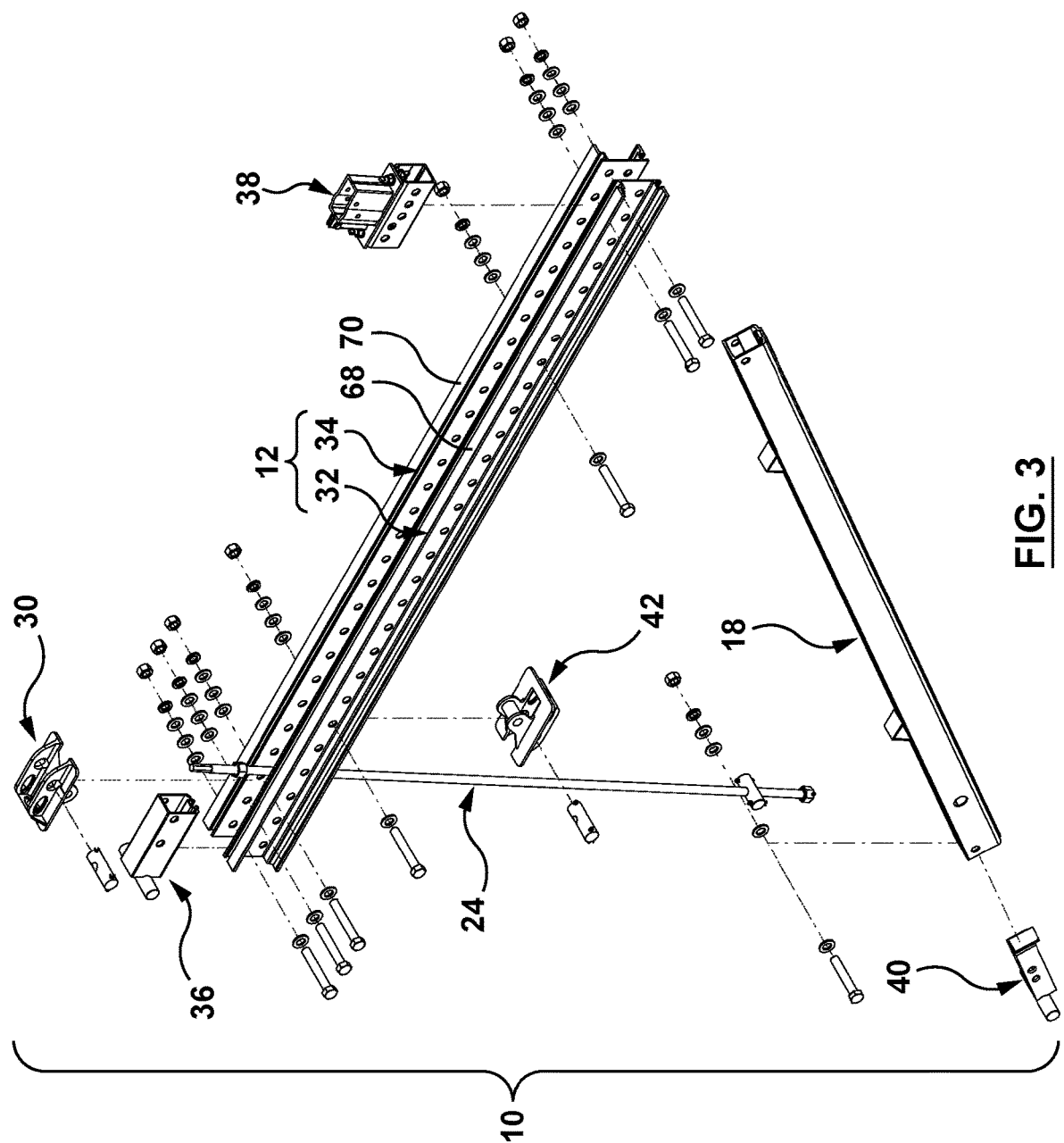

Referring to FIG. 3, the top member 12 is shown to be formed of first and second channel members 32, 34, which are arranged in parallel. A first bumper 36 and a guard post holder 38 are positioned between the channel members 32, 34. A second bumper 40 is received by the lower end of the diagonal member 18. An additional hanger element, indicated by reference numeral 42, is shown in an inverted position relative to the hanger element 30, underneath the channel members 32, 34. The hanger element 42 may be used for attaching the assembly 10 to a tie rod (not shown). FIG. 3 further illustrates hardware for securing the components together.

Figure 4:
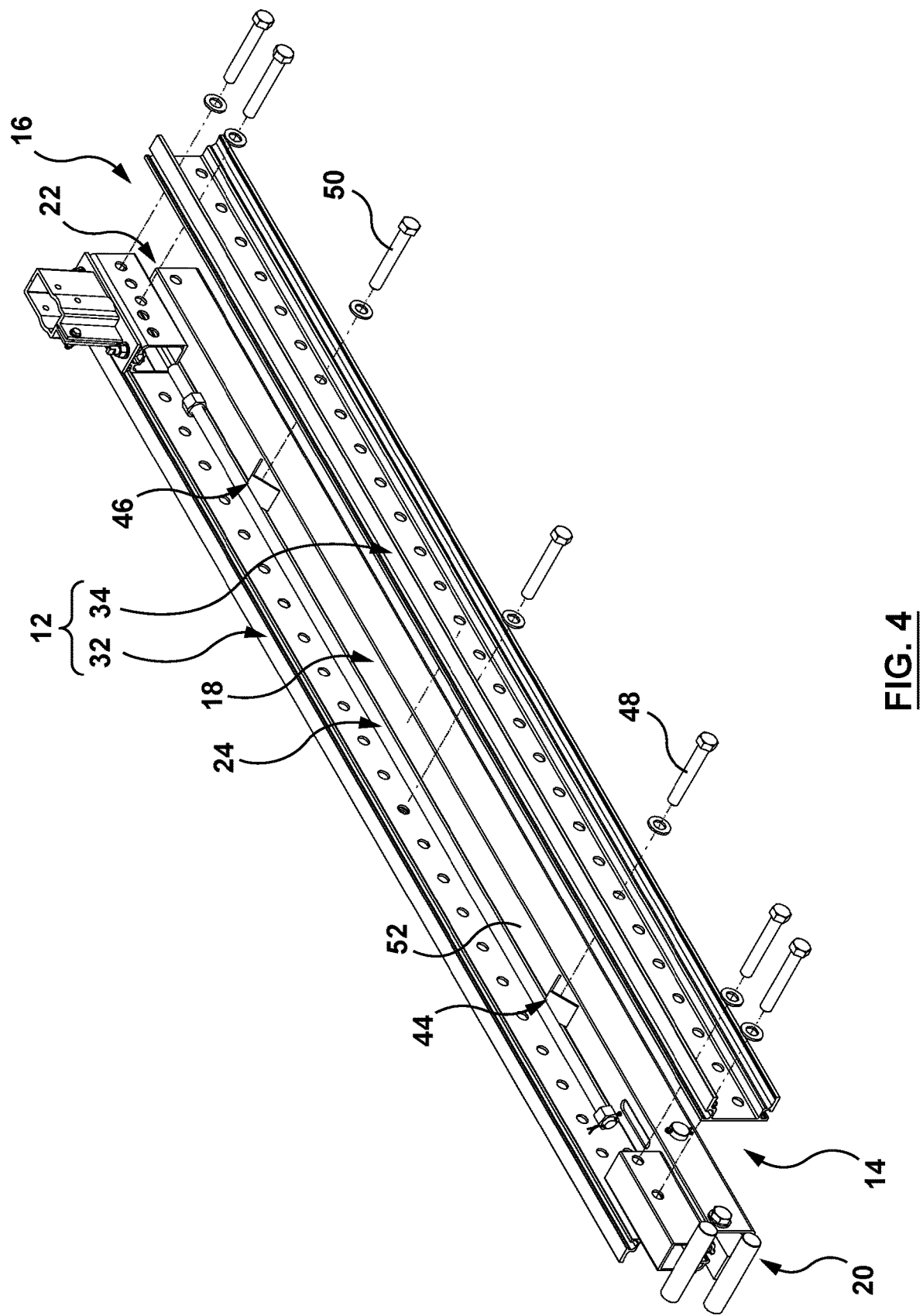
FIG. 4 is an exploded view of parts of the assembly of FIG. 1 shown moved into a shipping/storage position.

Referring to FIG. 4, the diagonal and side members 18, 24 are shown pivoted relative to the channel members 32, 34 to achieve a storage/shipping position. In this position, the diagonal member 18 may be generally parallel with the channel members 32, 34, so that the lower and upper ends 20, 22 of the diagonal member 18 are adjacent to the inner and outer ends 14, 16 of the top member, respectively.

In the example illustrated, the diagonal member 18 includes connection tabs 44, 46 arranged intermediate the lower and upper ends 20, 22. The connection tabs 44, 46 are configured to receive respective bolts 48, 50 secured to holes in the channel members 32, 34 to connect the channel members 32, 34 and the diagonal member 18 together in the shipping/storage position. In the example illustrated, the connection tabs 44, 46 are disposed on and stand proud of an upper surface 52 of the diagonal member 18.

Figure 5:
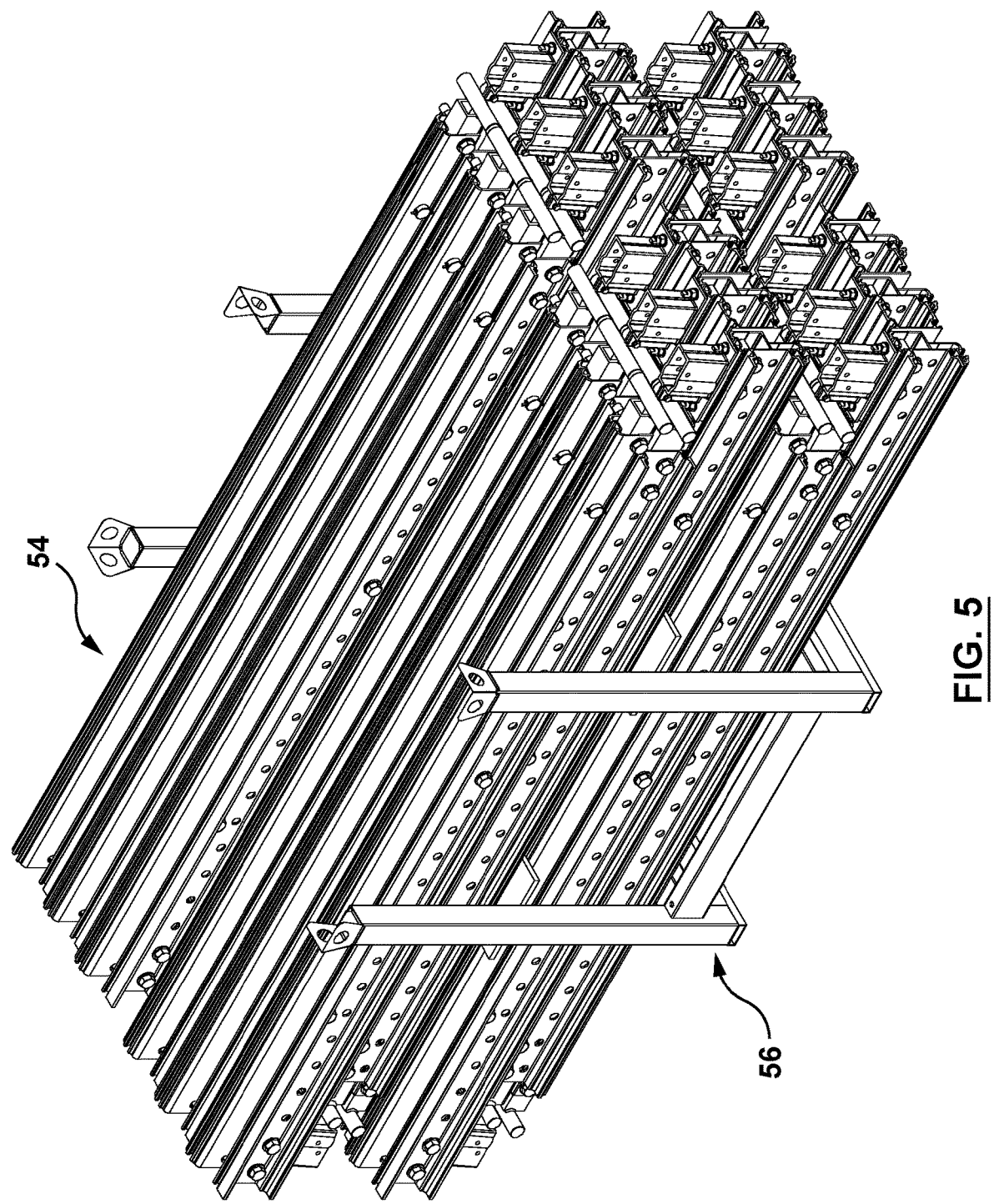
FIGS. 5, 6 and 7 are perspective, side and top views, respectively, of bridge bracket overhang assemblies in the shipping/storage position and loaded onto a rack.
Figure 6:
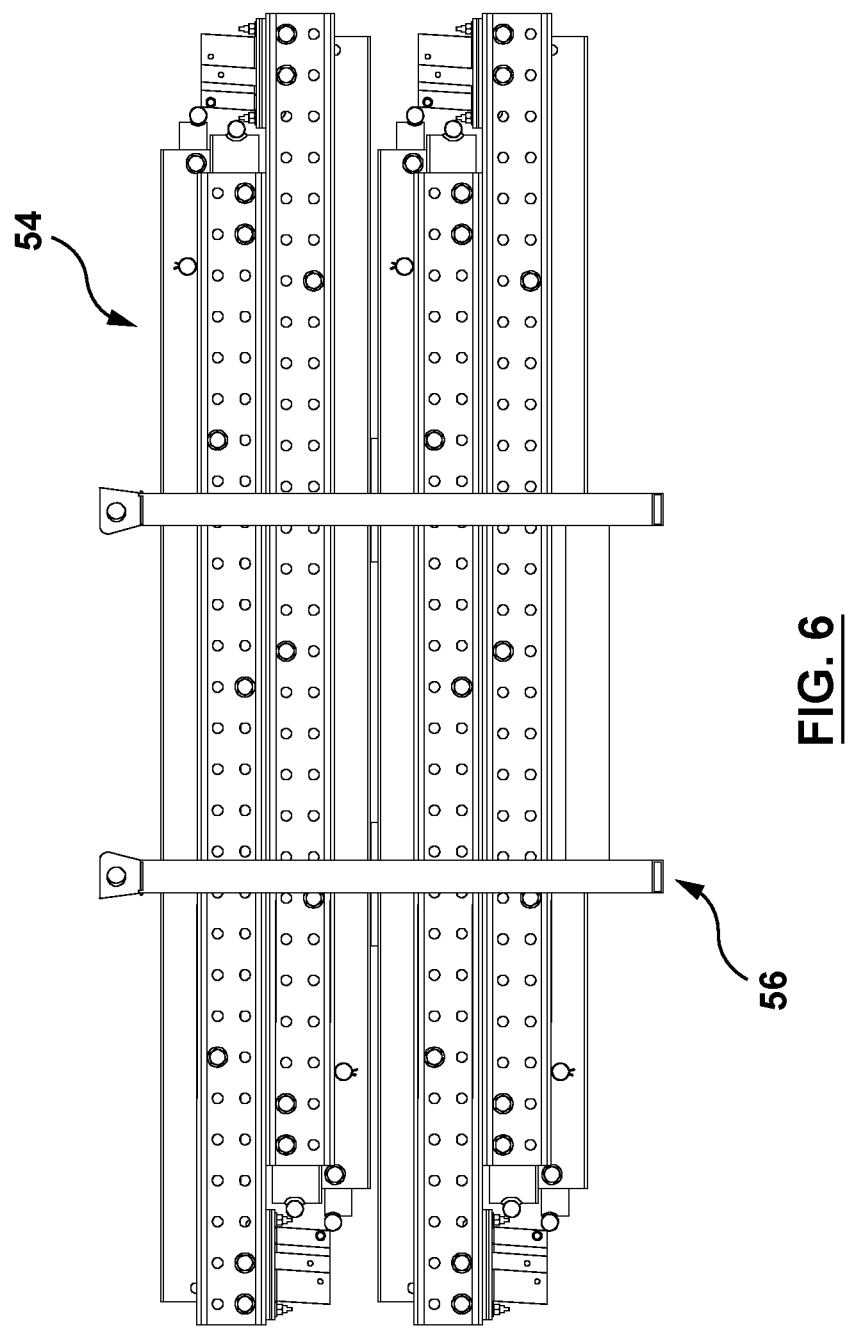
Figure 7:
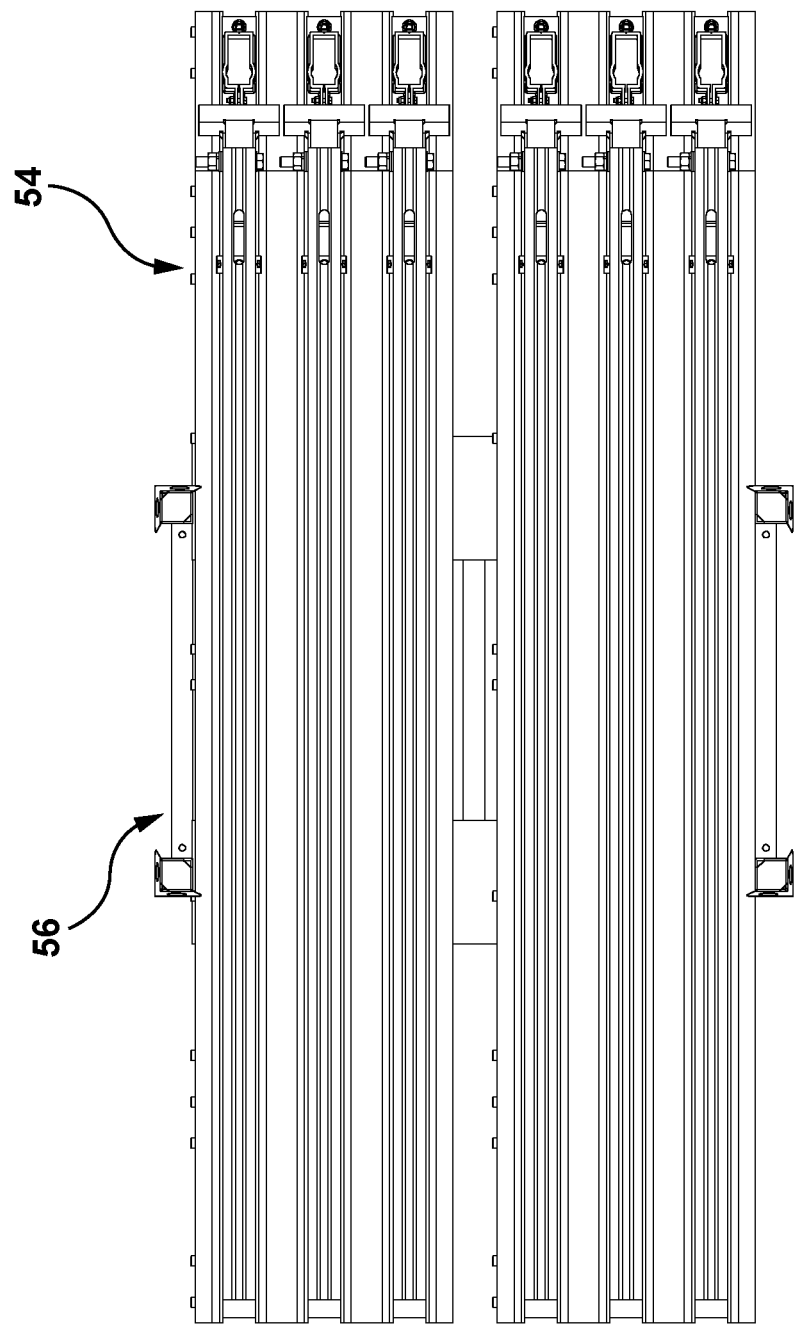

Referring to FIGS. 5, 6 and 7, a plurality of bridge overhang bracket assemblies 54 are shown in the storage/shipping position and stacked on a rack 56. The rack 56 may be handled with a standard yard forklift, and with a crane by attaching chains to the lifting lugs provided. As illustrated, the storage/shipping position is relatively compact thereby enabling efficient storage and/or shipping.

Referring again to FIGS. 1 and 2, it will be appreciated that by adjusting the longitudinal position of the hanger element 30, the position of the diagonal and side members 18, 24 may be varied quickly and easily, without disassembly, i.e. without having to split and separate the channel members 32, 34, and may enable folding of the members 18, 24 to the shipping/storage position. Similarly, by adjusting the longitudinal position of the hanger element 42, the position of the assembly 10 relative to the bridge beam/girder may be varied quickly and easily, without disassembly.

Referring to FIGS. 8A, 8B, 9A and 9B, the hanger element 30, 42 is shown to include a pair of plates 58 each having a generally horizontal bore 60 extending therethrough. The bores 60 receive a pivot pin 62 in sliding fit. As illustrated, cotter pins may be used to maintain the pivot pin 62 in the bores 60. The pivot pin 62 includes a generally vertical bore 64 through which the side member 24 is received (see FIG. 3). In some examples, the side member 24 includes a threaded rod, and the vertical bore 64 includes a thread engaging element engaged with the threaded rod. The threaded rod and the thread engaging element may be rotatable relative to each other and rotation of one relative to the other moves the thread engaging element along an axial length of the threaded rod.

In some examples, the hanger element 30 is configured to slide relative to a top surface of the top member 12, and the hanger element 42 may configured to slide relative to a bottom surface of the top member 12. In the example illustrated, the hanger element 30, 42 includes a generally planar flange surface 66 for bearing against the top and bottom surfaces of the top member 12. In FIG. 3, the top surfaces of the channel members 32, 34 are indicated by reference numerals 68, 70, respectively. Accordingly, in some examples, the hanger element 30 may serve to distribute force uniformly across the full width of surfaces 68, 70, and the hanger element 42 may serve to distribute force uniformly across the full width of bottom surfaces of the channel members 32, 34.

In the example illustrated, the hanger element 30, 42 includes a body 72 disposed intermediate of the flange surface 66. The body 72 is configured to space apart the channel members 32, 34. The body 72 is shown to include an aperture 74 for receiving a bolt to fix the longitudinal position of the hanger element 30, 42 relative to the top member 12. As illustrated, the channel members 32, 34 may each include an array of holes extending along its length to provide a variety of connection points for the hanger element 30, 42.

A second aspect of the present disclosure relates to T-bolt fasteners. The structure and function of conventional T-bolt fasteners is described in U.S. Pat. No. 6,059,258, the entire contents of which is hereby incorporated herein by reference.

Figure 10:
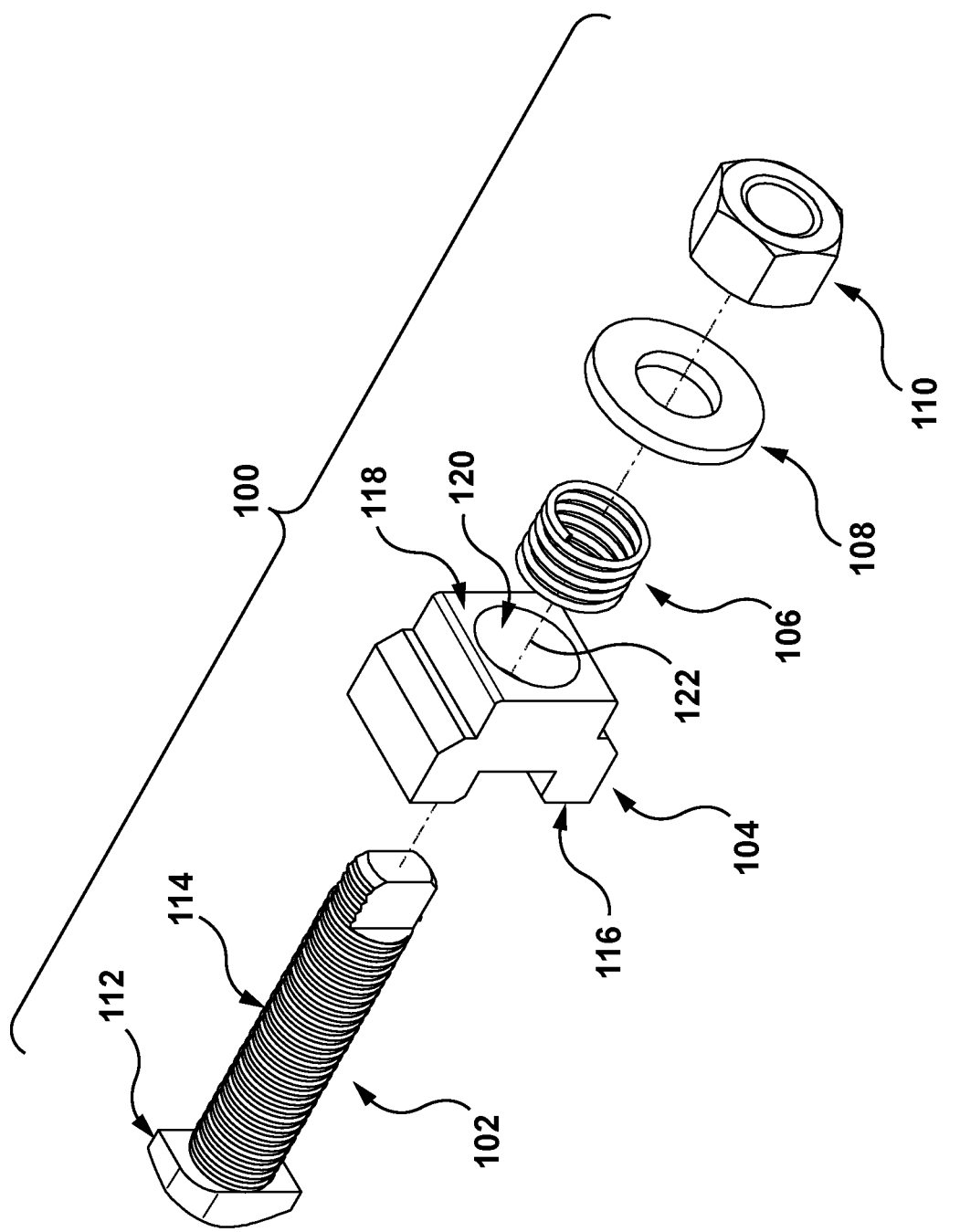
FIG. 10 is an exploded view of an example of a fastener assembly.

Referring to FIG. 10, an example of a fastener assembly is shown generally at reference numeral 100. In the example illustrated, the fastener assembly 100 includes a bolt 102, a clamp member 104, a biasing member 106, a washer 108 and a nut 110. The bolt 102 is shown to include a head 112 and a threaded body 114. The clamp member 104 is shown to include an inner side 116, an opposed outer side 118, and a bore 120 extending along a bore axis 122 through the clamp member 104 between the inner and outer sides 116, 118.

Figure 11C:
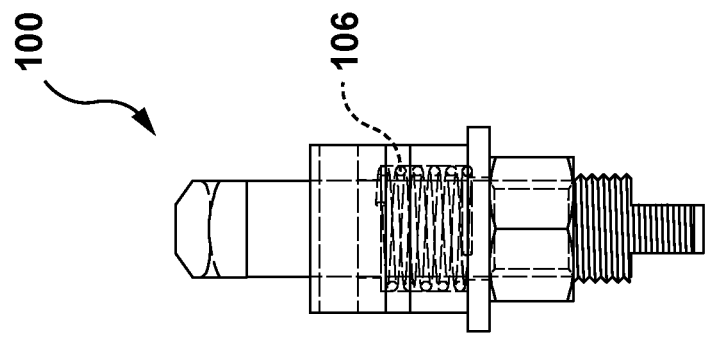
FIGS. 11A, 11B and 11C are perspective and first and second side views, respectively, of the fastener assembly of FIG. 10.
Figure 11B:
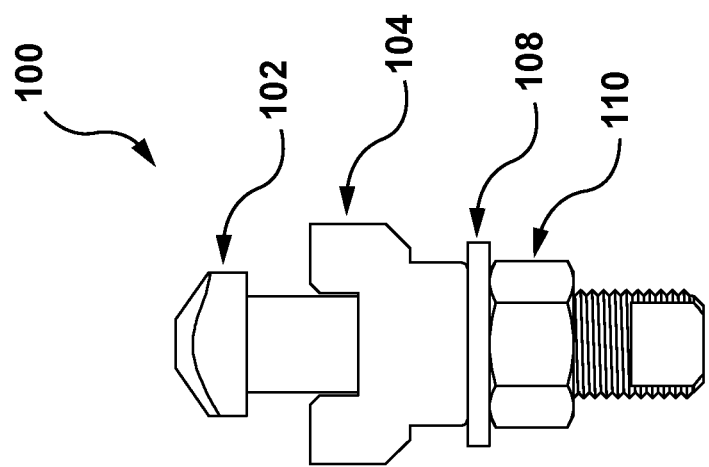
Figure 11A:
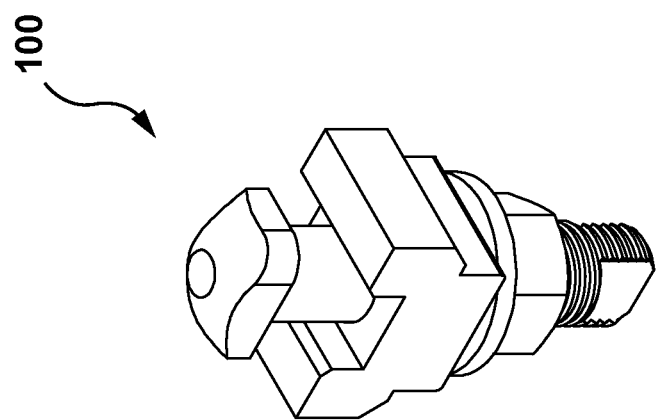

The fastener assembly 100 is shown assembled in FIGS. 11A, 11B and 11C. Referring to FIGS. 11A, 11B and 11C (and with continued reference to FIG. 10), the head 112 is at the inner side 116 of the clamp member 104 and the body 114 extends through the bore 120. In the example illustrated, the bolt 102 may slide relative to the clamp member 104 along the bore axis 122 between a retracted position in which the head 112 is proximate to the inner side 116 and an advanced position in which the head 112 is spaced from the inner side 116. The nut 110 is threaded onto the body 114 of the bolt 102 at the outer side 118 of the clamp member 104. The biasing member 106 and the washer 108 are arranged between the clamp member 104 and the nut 110 to bias the bolt 102 to the retracted position. In the example illustrated, the biasing member 106 takes the form of a spring.

Figure 12:
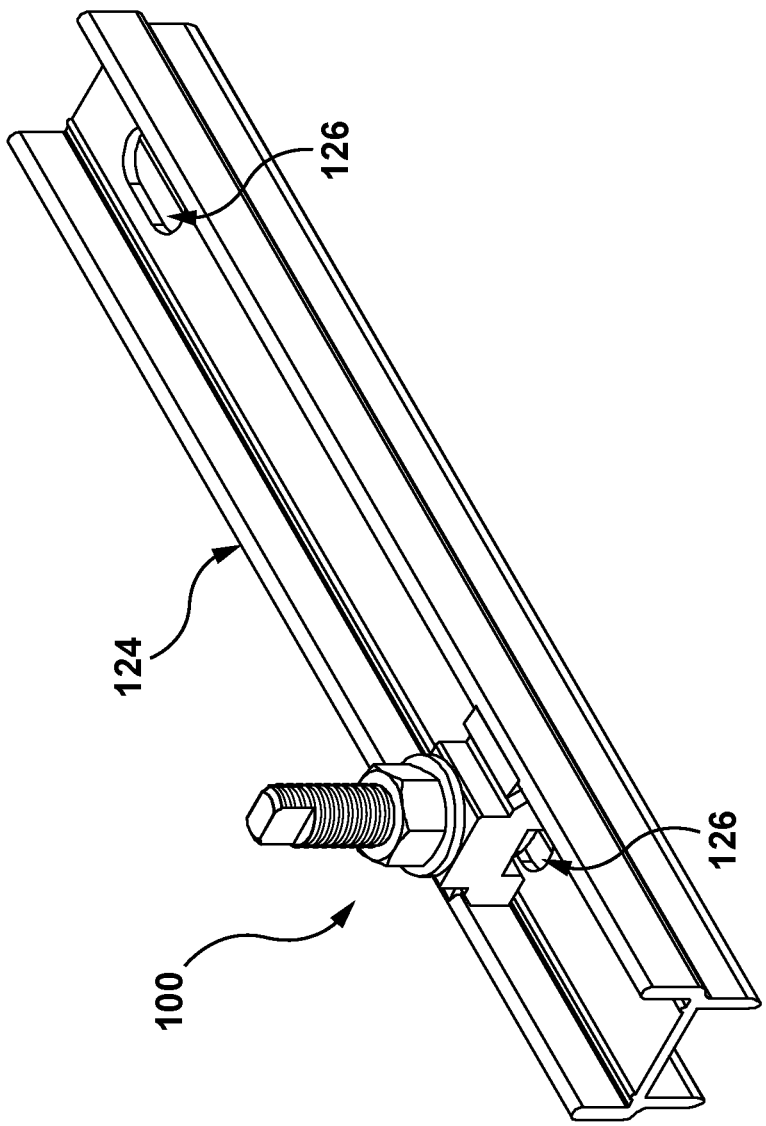
FIG. 12 is a perspective view of the fastener assembly of FIG. 10 and a side rail.
Figure 13A:
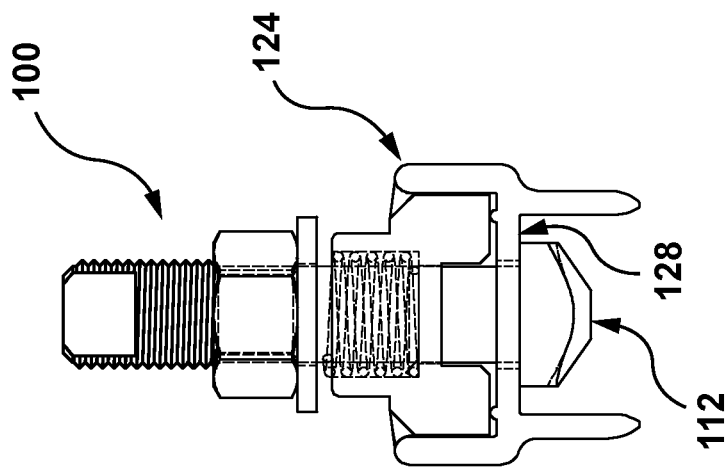
FIGS. 13A and 13B are end views of the fastener assembly of FIG. 10 and the side rail, showing unlocked and locked engagement, respectively.
Figure 13B:
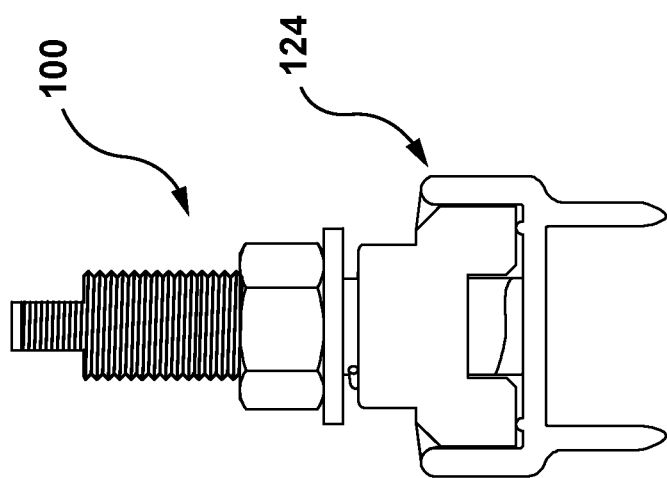

Referring to FIGS. 12, 13A and 13B, the fastener assembly 100 is shown in combination with a side rail 124. The side rail 124 includes an opening 126 having a length that is substantially larger that its width. The head 112 has a width that is smaller than the width of the opening 126 and a length that is larger than the width of the opening 126. It will be appreciated that when the fastener assembly 100 is in unlocked engagement (FIG. 13A), in which the length of the head 112 is aligned with the length of the opening 126, the head 112 may be advanced for insertion into the opening 126 and retracted for removal from the opening 126. In the advanced position, the bolt 102 may be rotated relative to the clamp member 104 about the bore axis 122 approximately 90° between unlocked and locked engagement (FIG. 13B) in which the head 112 engages overlapping interior edges 128 around the opening 126 of the side rail 124, with the biasing member 106 urging the head 112 against the side rail 124, thereby to secure the fastener assembly 100 to the side rail 124. Accordingly, the fastener assembly 100 may be quickly and easily secured to the side rail 124.

Figure 15:
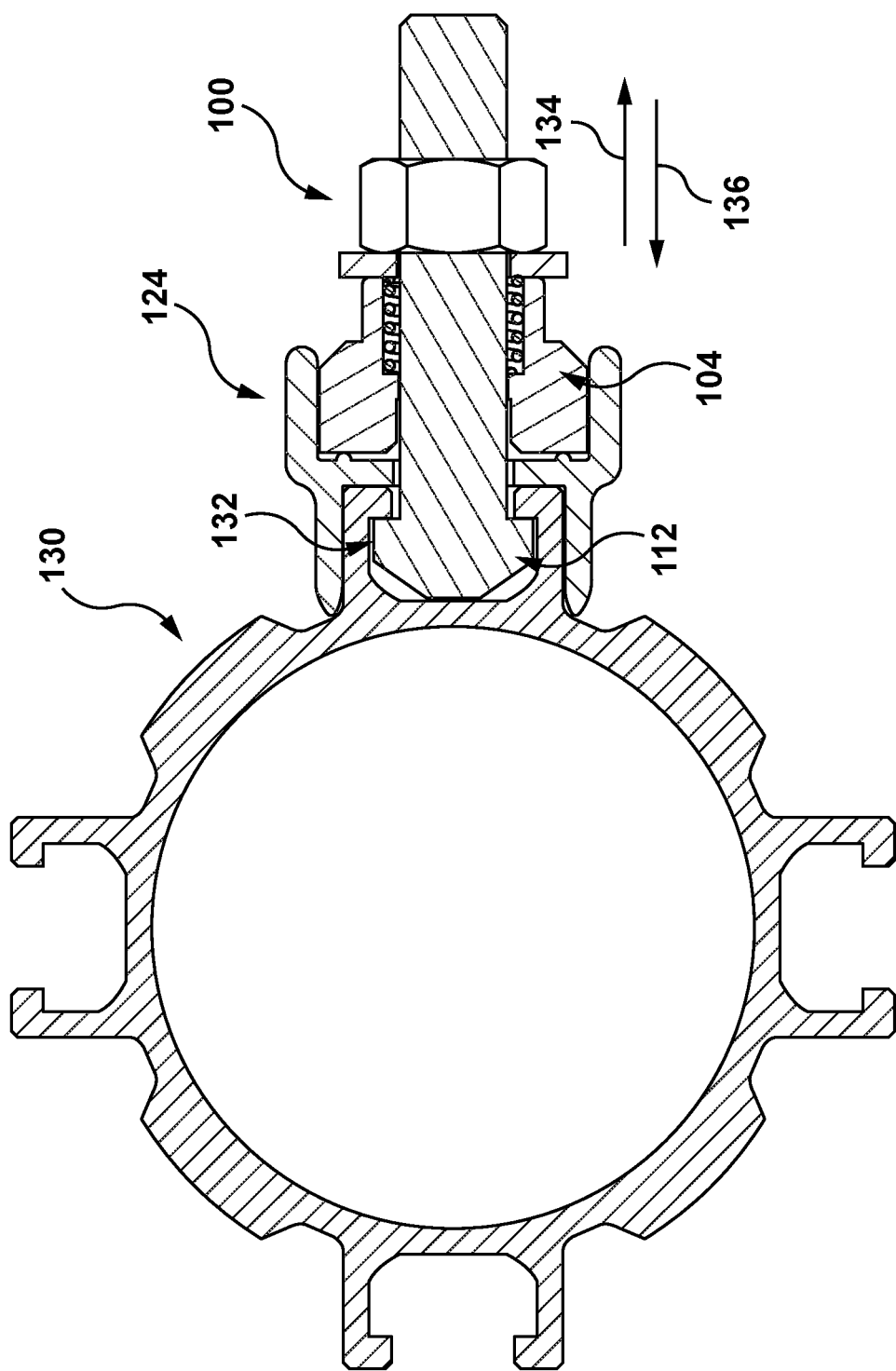
FIG. 15 is a sectional view of the fastener assembly of FIG. 10, the side rail and the shoring leg, in which the fastener assembly is in locked engagement.

Referring to FIGS. 14 and 15, the fastener assembly 100 is shown in combination with the side rail 124 and a shoring leg 130 having a plurality of T-bolt channels 132. A purpose of the fastener assembly 100 is to attach the shoring leg 130 to the side rail 124, and thus the whole modular ledger, thereby quickly and easily turning legs and ledgers into a shoring frame, or vis versa turning a frame into legs that can be used as a post shore.

Again, the width of the head 112 is smaller than an opening width of the T-bolt channel 132 and the length is larger than the opening width and smaller than an inner width of the T-bolt channel. In the advanced position, the bolt 102 may be rotated relative to the clamp member 104 about the bore axis 122 between unlocked engagement, in which the head 112 may be inserted through the opening 126 of the side rail 124 into the T-bolt channel 132, and locked engagement, in which the head 112 engages overlapping interior edges of the T-bolt channel 132, with the biasing member 106 urging the head 112 against the T-bolt channel 132 in a first direction 134 and the clamp member 104 against the side rail 124 in a second direction 136 opposite the first direction 134, thereby to secure the side rail 124 and the T-bolt channel 132 together. Accordingly, the fastener assembly 100 may be used to quickly and easily secure the side rail 124 and the T-bolt channel 132 together.

While the above description provides examples of one or more apparatuses or methods, it will be appreciated that other apparatuses or methods may be within the scope of the accompanying claims.

We claim:

1. A bridge overhang bracket assembly, comprising:
  a top member extending lengthwise between inner and outer ends, the top member comprising a top surface and a bottom surface;
  a diagonal member extending lengthwise between lower and upper ends, the top and diagonal members being pivotally attached proximate to the respective outer and upper ends thereof;
  a first hanger element mounted to the top member and translatable along the top surface of the top member;
  a second hanger element mounted to the top member and translatable along the bottom surface of the top member; and
  a side member extending lengthwise between bottom and top ends, the diagonal and side members being pivotally attached proximate to the respective lower and bottom ends thereof, and the first hanger element being pivotally attached proximate to the top end of the side member,
  wherein the first hanger element comprises a first pivot pin pivotally mounted about a generally horizontal first pivot axis, and the side member is attached to the first pivot pin, wherein the first hanger element comprises a generally horizontal bore receiving the first pivot pin in sliding fit, wherein the first pivot pin comprises a generally vertical bore through which the side member is received, wherein the side member comprises a threaded rod, and the vertical bore comprises a thread engaging element engaged with the threaded rod, wherein the threaded rod and the thread engaging element are rotatable relative to each other and rotation of one relative to the other moves the thread engaging element along an axial length of the threaded rod, wherein the second hanger element comprises a second pivot pin pivotally mounted about a generally horizontal second pivot axis, the second pivot pin attaching the assembly to a tie rod, wherein the first hanger element slides relative to the top surface of the top member to adjust a longitudinal position of the first hanger element relative to the top member, wherein the second hanger element slides relative to the bottom surface of the top member to adjust a longitudinal position of the second hanger element relative to the top member, wherein each of the first and second hanger elements comprises a generally planar flange surface bearing respectively against the top and bottom surfaces of the top member, and wherein the first pivot axis is above the top surface of the top member, and the second pivot axis is below the bottom surface of the top member.

2. The assembly of claim 1, wherein the top member comprises first and second channel members arranged in parallel, and each of the hanger elements comprises a body disposed intermediate of the respective flange surface, the body spacing apart the first and second channel members.

3. The assembly of claim 2, wherein the body of each of the hanger elements comprises an aperture receiving a bolt fixing the longitudinal position of the respective hanger element relative to the top member.

4. The assembly of claim 1, wherein the diagonal member comprises at least one connection tab arranged intermediate the upper and lower ends, the connection tab for receiving a bolt to connect the top and diagonal members together in a shipping/storage position.

5. The assembly of claim 4, wherein the at least one connection tab is disposed on an upper surface of the diagonal member.

6. A method, comprising:
providing the assembly of claim 1;
translating each of the hanger elements along the top member to adjust the longitudinal positions of the hanger elements relative to the top member; and
fastening the hanger elements to the top member to fix the longitudinal positions.

7. The method of claim 6, wherein the step of fastening comprises bolting a body of each of the hanger elements to the top member.

8. A method, comprising:
providing the assembly of claim 1;
positioning the diagonal member in parallel with the top member so that the lower and upper ends of the diagonal member are adjacent to the inner and outer ends of the top member, respectively; and
fastening the top and diagonal members together in a shipping/storage position.

9. The method of claim 8, wherein the step of fastening comprises bolting at least one connection tab of the diagonal member to the top member, and comprising stacking a plurality of the assembly in the shipping/storage position on a rack.

10. A bridge overhang bracket assembly, comprising:
a top member extending lengthwise between inner and outer ends;
a diagonal member extending lengthwise between lower and upper ends, the top and diagonal members being pivotally attached proximate to the respective outer and upper ends thereof, the diagonal member comprising at least one connection tab arranged intermediate the lower and upper ends, the connection tab for receiving a bolt to connect the top and diagonal members together in a shipping/storage position;
a side member extending lengthwise between bottom and top ends, the diagonal and side members being pivotally attached proximate to the respective lower and bottom ends thereof;
a first hanger element mounted to the top member, the first hanger element pivotally attached proximate to the top end of the side member; and
a second hanger element mounted to the top member, the second hanger element attaching the assembly to a tie rod,
wherein the first hanger element comprises a generally horizontal bore, and a first pivot pin is received in the bore in sliding fit, the first pivot pin comprising a generally vertical bore through which the side member is received, the side member comprising a threaded rod, and the vertical bore comprising a thread engaging element engaged with the threaded rod, the threaded rod and the thread engaging element being rotatable relative to each other so that rotation of one relative to the other moves the thread engaging element along an axial length of the threaded rod,
wherein the second hanger element comprises a generally horizontal bore, and a second pivot pin is received in the bore in sliding fit, the second pivot pin attached to the tie rod,
wherein the first hanger element is slidable along a top surface of the top member to adjust a longitudinal position of the first hanger element relative to the top member, and the second hanger element is slidable along a bottom surface of the top member to adjust a longitudinal position of the second hanger element relative to the top member,
wherein each of the first and second hanger elements comprises a generally planar flange surface bearing respectively against the top and bottom surfaces of the top member, and
wherein the first pivot pin is above the top surface of the top member, and the second pivot pin is below the bottom surface of the top member.

11. A bridge overhang bracket assembly, comprising:
a top member extending lengthwise between inner and outer ends;
a diagonal member extending lengthwise between lower and upper ends, the top and diagonal members being pivotally attached proximate to the respective outer and upper ends thereof;
a first hanger element mounted to the top member and translatable along the top member for adjusting a longitudinal position of the hanger element relative to the top member;

a second hanger element mounted to the top member and translatable along the top member for adjusting a longitudinal position of the hanger element relative to the top member; and a side member extending lengthwise between bottom and top ends, the diagonal and side members being pivotally attached proximate to the respective lower and bottom ends thereof, and the first hanger element being pivotally attached proximate to the top end of the side member, wherein the first hanger element is configured to slide relative to a top surface of the top member, and the second hanger element is configured to slide relative to a bottom surface of the top member, wherein the first hanger element comprises a generally planar flange surface for bearing against the top surface of the top member, and the second hanger element comprises a generally planar flange surface for bearing against the bottom surface of the top member, wherein the first hanger element comprises a first pivot pin attached to the side member, the second hanger element comprises a second pivot pin for attaching the assembly to a tie rod, and wherein the first pivot pin is above the top surface of the top member, and the second pivot pin is below the bottom surface of the top member.

12. The assembly of claim 11, wherein the top member comprises first and second channel members arranged in parallel, and each of the hanger elements comprises a body disposed intermediate of the respective flange surface, the body of each of the hanger elements configured to space apart the first and second channel members.

13. The assembly of claim 12, wherein the body of each of the hanger elements comprises an aperture for receiving a bolt to fix the longitudinal position of the respective hanger element relative to the top member.

14. The assembly of claim 13, wherein the diagonal member comprises at least one connection tab arranged intermediate the upper and lower ends, the connection tab for receiving a bolt to connect the top and diagonal members together in a shipping/storage position.

15. The assembly of claim 14, wherein the at least one connection tab is disposed on an upper surface of the diagonal member.

16. The assembly of claim 1, wherein the flange surface of the first hanger element distributes force across a full width of the top surface of the top member, and the flange surface of the second hanger element distributes force across a full width of the bottom surface of the top member.

17. The assembly of claim 2, wherein the flange surface of the first hanger element distributes force across a full width of the top surface of the first and second channel members, and the flange surface of the second hanger element distributes force across a full width of the bottom surface of the first and second channel members.

18. The assembly of claim 10, wherein the flange surface of the first hanger element distributes force across a full width of the top surface of the top member, and the flange surface of the second hanger element distributes force across a full width of the bottom surface of the top member.

19. The assembly of claim 11, wherein the flange surface of the first hanger element is configured to distribute force across a full width of the top surface of the top member, and the flange surface of the second hanger element is configured to distribute force across a full width of the bottom surface of the top member.

20. The assembly of claim 12, wherein the flange surface of the first hanger element is configured to distribute force across a full width of the top surface of the first and second channel members, and the flange surface of the second hanger element is configured to distribute force across a full width of the bottom surface of the first and second channel members.

* * * * *